United States Patent [19]

Haas et al.

[11] Patent Number: 4,584,109

[45] Date of Patent: Apr. 22, 1986

[54] METHOD OF CONTROLLING THE MOBILITY OF FLOWS THROUGH FISSURES, SLITS OR PORES

[75] Inventors: Raimund Haas, Frankfurt am Main; Dieter Ohlendorf, Liederbach; Werner Interthal, Rüsselsheim, all of Fed. Rep. of Germany

[73] Assignee: Hoechst Aktiengesellschaft, Fed. Rep. of Germany

[21] Appl. No.: 584,648

[22] Filed: Feb. 29, 1984

[30] Foreign Application Priority Data

Mar. 2, 1983 [DE] Fed. Rep. of Germany ....... 3307252

[51] Int. Cl.$^4$ .......................... C09K 3/00; E21B 43/16
[52] U.S. Cl. .................. 252/8.55 D; 166/275
[58] Field of Search ................ 252/8.55 D; 166/274, 166/275, 292, 270

[56] References Cited

U.S. PATENT DOCUMENTS

| | | | |
|---|---|---|---|
| 3,302,713 | 2/1967 | Ahearn et al. | 166/275 |
| 3,799,263 | 3/1974 | Prillieux et al. | 166/275 |
| 4,469,608 | 9/1984 | Hinkamp | 166/275 |
| 4,502,540 | 3/1985 | Byham | 252/8.55 D |

*Primary Examiner*—Theodore Morris
*Attorney, Agent, or Firm*—Connolly and Hutz

[57] ABSTRACT

Method of controlling the mobility of aqueous flows through fissures, slits or pores, in particular of flooding waters in tertiary production of crude oil, wherein cationic surfactants which, on measurement of the electric birefringence with a pulsed rectangular electrical field in pure aqueous solutions, give a measurement signal, from the decrease of which a relaxation time of 0.01 $\mu$s to 10 ms, in particular of 0.1 $\mu$s to 2 ms, results, are added to the aqueous medium. Preferred suitable cationic compounds are those of the general formula

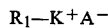

in which $R_1$ denotes $C_{12}$–$C_{26}$-alkyl or $C_{12}$–$C_{26}$-alkenyl, $K+$ denotes a group of the formula

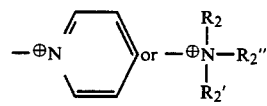

$R_2$ denotes $C_1$–$C_3$-alkyl, preferably methyl, $R'_2$ denotes $C_1$–$C_3$-alkyl, preferably methyl, $R''_2$ denotes $C_1$–$C_3$-alkyl, preferably methyl, or $R''_2$ denotes $(CH_2CH_2O)_xH$, where x denotes from 1 to 3, preferably 1 to 2, and $A^-$ denotes an anion of the following formulae: $SCN^{31}$, $R_3SO_3^-$, where $R_3$ is $C_6$–$C_9$-alkyl or -alkenyl and the sum of the carbon atoms in $R_1$ and $R_3$ should be at least 21;

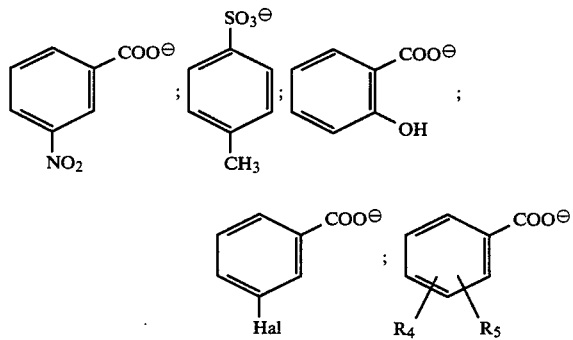

where Hal is chlorine or bromine, $R_4$ is $C_1$–$C_5$-alkyl, $C_2$–$C_5$-alkenyl or $C_1$–$C_5$-alkoxy in positions 3, 4, 5 and 6 and $R_5$ is hydrogen or hydroxyl in positions 2 and 3 relative to the carboxyl group, or

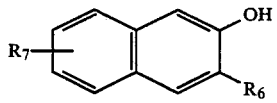

where $R_6$ is $COO^-$ or $SO_3^-$ and $R_7$ is hydrogen or methyl.

8 Claims, No Drawings

METHOD OF CONTROLLING THE MOBILITY OF FLOWS THROUGH FISSURES, SLITS OR PORES

In industry, it is frequently desirable to slow down or control flows of liquids through fissures, slits or pore spaces. Thus, for example, the aim is to minimize losses by leakage through gaps in hydraulic systems or to achieve a slowing down of seepage flow in refuse dumps or construction excavations, which can mean a substantial technical advantage. Finally, in so-called tertiary production of crude oil (intensive production of crude oil) it is necessary, inter alia, to control the mobility of the flood bank which is to displace the crude oil from the porous deposits, in order to achieve the highest possible degree of oil removal. It is known that these fissure or pore flows can be slowed down by additives which increase the shear viscosity of the flooding medium. For intensive production of crude oil in particular, numerous processes have already been described which are based on the action of increasing the shear viscosity of the aqueous flood front. In particular, high-polymeric soluble additives have been recommended for increasing the viscosity (U.S. Pat. No. 3,724,545).

However, in practice, liquids thickened with high polymers have a number of disadvantages. Thus, for example, the viscosity-increasing effect of high polymers in aqueous solutions is greatly influenced by the temperature and by the addition of electrolytes. Under the conditions of crude oil deposits, with elevated temperature and salinity of the water in the deposits, the thickening action of the polymers as a rule decreases rapidly. However, even if it is possible approximately to achieve the required stability to heat and electrolytes by extremely high concentrations of polymer or by the use of specific polymers in the flooding water, these additives at the same time decrease the mobility of the flow in all pore regions. This means that, as before, in the flow channels in the pore space which have been penetrated from the pressure well to the producing well (fingering), most of the flooding water flows past the oil-yielding regions, although it has been slowed down.

The use of particular polymer mixtures which exhibit a drastically increased flow resistance only at points where the flooding liquid tries to break through to the producing well have been proposed in European Patent Application No. 80 104 489.2 specifically to avoid these disadvantages. Although this method is a substantial advance, it does not eliminate the disadvantages which are generally associated with the use of polymers, such as their sensitivity to heat and electrolytes, and in particular their shear sensitivity. As a result of these disadvantages, the polymers can be degraded and destroyed relatively easily and thus rapidly lose at least a large part of their thickening action.

Surprisingly, it has now been found that, instead of these polymers, it is also possible to use certain cationic compounds which do not have the disadvantages of polymers. These cationic compounds rheologically increase the flow resistance of the flooding medium, and thus influence its mobility in the desired sense.

The invention thus relates to a method for controlling the mobility of aqueous flows through fissures, slits or pores, which comprises adding to the aqueous medium a compound of the formula

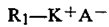

in which $R_1$ denotes $C_{12}$-$C_{26}$-alkyl or $C_{12}$-$C_{26}$-alkenyl, $K^+$ denotes a group of the formula

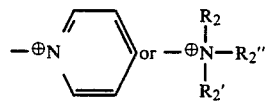

$R_2$ denotes $C_1$-$C_3$-alkyl, preferably methyl, $R'_2$ denotes $C_1$-$C_3$-alkyl, preferably methyl, $R''_2$ denotes $C_1$-$C_3$-alkyl, preferably methyl, or $R''_2$ denotes $(CH_2CH_2O)_xH$, where x denotes from 1 to 3, preferably 1 to 2, and $A^-$ denotes an anion of the following formula: $SCN^-$, $R_3SO_3^-$, where $R_3$ is $C_6$-$C_9$-alkyl or -alkenyl and the sum of the carbon atoms in $R_1$ and $R_3$ should be at least 21;

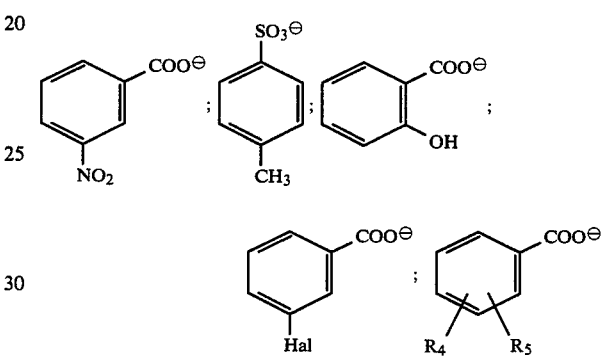

where Hal is chlorine or bromine, $R_4$ is $C_1$-$C_5$-alkyl, $C_2$-$C_5$-alkenyl or $C_1$-$C_5$-alkoxy in positions 3, 4, 5 and 6 and $R_5$ is hydrogen or hydroxyl in positions 2 and 3 relative to the carboxyl group, or

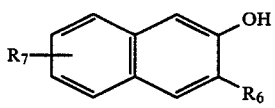

where $R_6$ is $COO^-$ or $SO_3^-$ and $R_7$ is hydrogen or methyl.

The salts from the following cations and anions are particularly preferred:

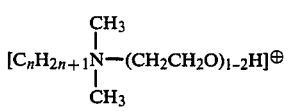

(a) with the anion $C_6H_{13}SO_3^-$ for $20 \leq n \leq 26$
(b) with the anion $C_7H_{15}SO_3^-$ for $14 \leq n \leq 22$
(c) with the anion $C_8H_{17}SO_3^-$ for $14 \leq n \leq 20$
(d) with the anion $SCN^-$ for $16 \leq n \leq 26$

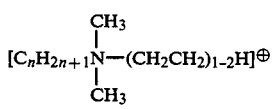

for 12 n 24 with the following benzoic acid anions
(a) salicylate or m-halogenobenzoate

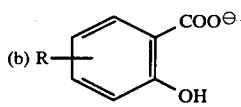

(b) where R=methyl, ethyl, propyl or $C_nH_{2n+1}O$, where $1 \leq n \leq 4$, preferably in positions 3, 4 or 5 relative to the carboxyl group.

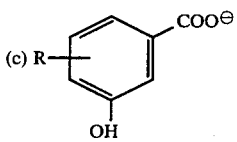

(c) where R=methyl, ethyl, propyl or $C_nH_{2n+1}O$— where $1 \leq n \leq 4$, preferably in positions 4 or 5 relative to the carboxyl group.

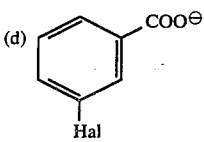

(d) where Hal=F, Cl, Br or I

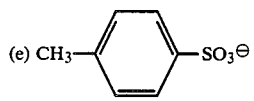

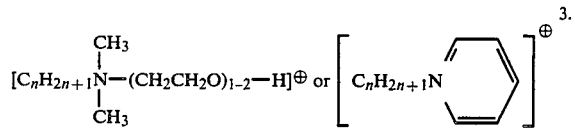

for $12 \leq n \leq 24$ with the anions 2-hydroxy-1-naphthoate, 3-(or 4)-hydroxy-2-naphthoate or the corresponding derivatives of naphtholsulfonic acids.

These quaternary ammonium salts can be prepared by the following routes.

The alkyl-trimethylammonium halides or pyridinium chlorides, bromides or iodides are first dissolved in anhydrous solvents, such as, for example, methanol, and a slight excess of freshly precipitated silver hydroxide, which has finally been washed with methanol, is added. As little water as possible should be thus introduced into the system, since otherwise difficulties are encountered on crystallization. When the system is briefly warmed to about 50°, formation of the alkyl-trimethylammonium or pyridinium hydroxide, which remains dissolved in the methanol, takes place.

In this reaction, the brown color of the silver hydroxide substantially disappears and the resulting precipitate assumes the color of silver halide. The silver halide precipitate is then filtered off with suction at about 15° C. The alkyl-trimethylammonium or pyridinium hydroxide in the methanolic filtrate can be neutralized by addition of the stoichiometric amount of a carboxylic acid, sulfonic acid or inorganic acid. The desired alkyl-trimethylammonium salt or pyridinium salt is obtained by evaporation of the methanol.

It is even simpler first to prepare the silver salts of the carboxylic acid in question, these salts frequently having a low water-solubility. Silver hydroxide or silver carbonate can be used as the starting substance here, which is neutralized with the desired carboxylic acid. However, it is also possible to dissolve the alkali metal carboxylates in water and to add silver nitrate solution, when the silver carboxylate precipitates. The silver carboxylate is filtered off with suction, mixed and dried. The stoichiometrically required amount of this carboxylate can then be added to a solution of the alkyl-trimethylammonium or pyridinium halide in an anhydrous solvent, such as methanol, and the mixture can be warmed briefly to 50° to 60° C.

In this case also, the silver halide is then filtered off with suction at 15° C. and the mixed alkyl-trimethylammonium or pyridinium carboxylate is obtained by evaporation of the filtrate. Further purification can be effected by recrystallization from virtually anhydrous solvents (ethyl acetate, acetone, acetonitrile or dichloroethane).

The preparation of the alkyl-trimethylammonium or pyridinium hydroxide solution by treatment of the alkyl-trimethylammonium or pyridinium halides (or other salts) with a strongly basic anion exchanger may also be mentioned as a further possibility, it likewise being necessary for this process to be carried out in an anhydrous solvent, such as, for example, methanol. This is again followed by neutralization with the desired carboxylic acid.

The salts mentioned are suitable for increasing the flow resistance of aqueous media in flows through fissures, slits or pores. They are added in concentrations of 0.01 to 5% by weight, preferably 0.05 to 0.5% by weight and particularly preferably 0.1 to 0.5% by weight, although a different lower critical concentration limit for adequate effectiveness exists for each surfactant salt, depending on the temperature; this limit can be determined by simple preliminary experiments, as described below.

The action as a flow resistance increasing agent (FRI) also depends on the temperature. The surfactant salts mentioned each have an adequate action as an FRI in a temperature range $\Delta T + 40°$ C. $\pm 15°$ C., it being possible to achieve an FRI action within a total temperature range of 0° C. to 140° C., depending on the nature of the individual surfactant salts. However, if the surfactant is in solution, the temperature can fall to 5°–20° C. below the solubility temperature either for a short time, i.e. for a few hours, or for a longer time of up to several weeks, depending on the surfactant. The surfactant salts mentioned are also suitble as FRI in aqueous mixtures with ethylene glycol, polyalkylene oxides or glycerol. An FRI action at temperatures below 0° C. can thus be achieved by admixing, for example, ethylene glycol. For all the surfactants, the lower temperatures limit for use as an FRI is the solubility temperature.

The following ranges in which the optimum effectiveness as an FRI occurs have been found for the n-alkyl-trimethylammonium salicylates: n-dodecyltrimethylammonium salicylate in the range from 0.14 to 1% by weight from 5° to 20° C.; n-tetradecyltrimethylammonium salicylate in the range from 0.04 to 1% by weight from 10° to 45° C.; n-hexadecyltrimethylammonium salicylate in the range from 0.03 to 1% by weight from 20° to 60° C.; n-octadecyltrimethylammonium salicylate in the range from 0.8 to 1% by weight from 40° to 75° C.; and n-doscosyltrimethylammonium salicylate in the range from 0.02 to 1% by weight for temperatures from 70° C., in particular above 90° C. In general, the temperature range in which adequate action as an FRI exists is shifted to higher temperatures by about 15° C. with each additional $C_2H_4$ group. If the pyridinium compounds are used, the preferred temperature range is about 8°–12° C. lower in comparison with the trimethylammonium salts of the same chain length.

Similar dependences are found for the corresponding p-toluenesulfonates, except that the minimum concentrations for use as an FRI are greater than for the salicylates of the same chain length by a factor of 3 to 7.

Similar dependences as those for the corresponding salicylates are likewise found for the n-alkyltrimethylammonium thiocyanates and n-alkylpyridinium thiocyanates. Thus, for example, the following ranges of optimum effectiveness as an FRI have been found: n-hexadecyltrimethylammonium thiocyanate in the range from 0.03% by weight to 1% by weight for 45° to 65° C.; n-octadecyltrimethylammonium thiocyanate from 0.05 to 1% by weight for 60° to 80° C.; n-docosyltrimethylammonium thiocyanate from 0.03 to 1% by weight for temperatures above 85° C. and n-hexadecylpyridinium thiocyanate from 0.05 to 1% by weight for 40° to 60° C.

However, the preferred temperature and concentration range is determined not only by the chain length of the n-alkyltrimethylammonium or n-alkylpyridinium compound but also by the nature of the counter-ion.

Thus, for example, the compounds hexadecyltrimethylammonium 3-(or 4)-methylsalicylate or hexadecyltrimethylammonium 4-ethoxysalicylate exhibit an adequate action as an FRI already at from 0.01% by weight to 1% by weight in aqueous solution at 40° C., and in the concentration range of from 0.05 to 1% by weight above 65° C., whilst hexadecyltrimethylammonium salicylate exhibits an activity from 0.015% by weight at 30° C. and only at concentrations of more than 0.8% by weight above 70° C.

Quite generally, the n-alkyltrimethylammonium and n-alkylpyridinium compounds with the counter-ions

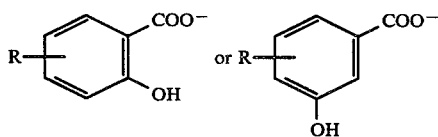

where $R=C_1-C_5$-alkyl or $C_1-C_5$-alkoxy, exhibit a shift in the lower concentration limit for activity as an FRI to smaller values and at the same time an extension of the temperature range to higher values, compared with the corresponding pure salicylate compounds, as the chain length of R increases. A further increase in the temperature range in which an action exists is achieved by using surfactants with the anions

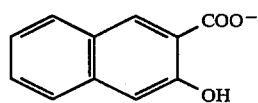

For example, the compounds hexadecyltrimethylammonium 3-(or 4)-hydroxy-2-naphthoate exhibit an activity in the concentration range from 0.005% by weight to 1% by weight at 50° C. and in the concentration range from 0.025% by weight to 1% by weight above 80° C. Similar comments apply to the corresponding pyridinium compounds, except that the temperature ranges are in general shifted downwards by about 5°–15° C. Analogously to the salicylate compounds, the change in chain length of the n-alkyltrimethylammonium and n-alkylpyridinium cation also causes a shift in the temperature range for FRI action in the case of the hydroxynaphthoates. For example, in each case 1,000 ppm solutions of the compounds $n-C_nH_{2n+1}$trimethylammonium 3-hydroxy-2-naphthoate exhibit activity from temperatures of 65°–85° C., with n=18 also above 105° C., with n=20 also above 115° C. and with n=22 also above 125° C. Quite generally, in the case of the n-alkyltrimethylammonium or n-alkylpyridinium 3-hydroxy-2-naphthoates, the effective temperature range is extended to temperatures 20° to 40° C. higher in comparison with the particular n-alkyltrimethylammonium or n-alkylpyridinium salicylates.

In the case of n-alkyltrimethylammonium n-alkyl-1-sulfonates and n-alkylpyridinium n-alkyl-1-sulfonates, the temperature range and concentration range in which activity as an FRI exists is likewise determined by the chain lengths of the alkyl groups both in the anion and in the cation.

For example, the compound tetradecyltrimethylammonium heptane-1-sulfonate exhibits activity in the concentration range from 0.02 to 2% by weight, preferably 0.07 to 0.5% by weight, in the temperature range from 5° C. to 38° C. In contrast, the compound hexadecyltrimethylammonium heptane-1-sulfonate has activity as an FRI in the concentration range from 0.02 to 2% by weight, preferably 0.07 to 0.5% by weight, in the temperature range from 10° C. to 50° C.

A further increase in the chain length of the n-alkyltrimethylammonium or n-alkylpyridinium cation causes a further shift in the effective temperature range to higher temperatures. For example, the compound n-docosyltrimethylammonium n-heptane-1-sulfonate still exhibits an FRI action in the concentration range from 0.1 to 1% by weight even for temperatures above 75° C.

In comparison with the n-heptane-1-sulfonates, the particular corresponding n-octane-1-sulfonates have activity as FRI in a temperature range which is about 10° to 30° C. higher. For example, the compound n-tetradecyltrimethylammonium n-octane-1-sulfonate also exhibits activity in the concentration range from 0.2 to 1% by weight above 45° C., and the compound n-octadecyltrimethylammonium n-octane-1-sulfonate still exhibits activity in the concentration range from 0.2 to 1% by weight even above 85° C. In general, lengthening of the n-alkyl chain both in the anions and in the cations causes a shift in the effective temperature range to higher temperatures.

Of all the surfactants mentioned, those which are particularly suitable as FRI above 90° C. are the salts $C_nH_{2n+1}K^+A^-$, in which $K^+$ represents the quaternary nitrogen group

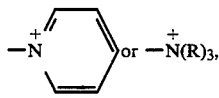

where R=—CH₃ or —C₂H₅ and A⁻ comprises the following anions:

1. for $n \geq 22$: salicylate or 3-halogeno-benzoate, where halogen=F, Cl, Br or I
2. for $n \geq 20$: 5- or 6-methyl-salicylate, methoxysalicylate or n-octane-1-sulfonate
3. for $n \geq 18$: 3- or 4-methyl-2- or -3-hydroxybenzoate, 3- or 4-ethoxy-2- or -3-hydroxybenzoate, n-nonane-1-sulfonate or 2-hydroxy-1-naphthoate
4. for $n \geq 16$: 3- or 4-alkyl-2- or -3-hydroxybenzoate, where alkyl=C₂–C₄, 3- or 4-alkoxy-2- or -3-hydroxybenzoate, where alkyl=C₃–C₅, or 3- or 4-hydroxy-2-naphthoate.

The salts of group 4 for $n \geq 18$ are particularly effective as FRI for temperatures above 100° C.

It has furthermore been found that, by increasing the pH value of the aqueous solution to pH values above 8, preferably to pH=9 to 10.5, by addition of NaOH or other bases or by addition of Na₂CO₃ or other salts which increase the pH value, the activity as an FRI is either not influenced, as, for example, in the case of the sulfonates, or is substantially improved, as, for example, in the case of the hydroxy-benzoates and the compounds derived therefrom. A lowering of the pH value with HCl or other strong acids to pH values below 4.5 also leads to the same influencing of the FRI action of the surfactants.

The presence of the other foreign electrolytes leads to no influence, as, for example, in the case of the sulfonates, or can even intensify the action, as, for example, in the case of the hydroxybenzoates and the compounds derived therefrom.

Examples of possible foreign electrolytes of this type are weak acids, such as acetic acid or formic acid, and salts which are formed from the following ions: alkali metal, alkaline earth metal, transition metal, ammonium or aluminum cations; and halides, $ClO_3^-$, $ClO_4^-$, $BrO_3^-$, $IO_3^-$, $S_2O_3^{2-}$, $SO_4^{2-}$, $S_2O_8^{2-}$, $NO_2^-$, $B_4O_7^{2-}$, $NO_3^-$, $PO_4^{3-}$, $CO_3^{2-}$, $CH_3COO^-$, $C_2O_4^{2-}$, $CH^-$, $CrO_4^{2-}$ or $Cr_2O_7^{2-}$. The maximum amount of these foreign electrolytes which can be added to the aqueous surfactant solution is limited by the concentration at which a salting out effect for the surfactant occurs, associated with a decrease or complete disappearance of the activity as an FRI.

The effect of the foreign electrolytes also depends on the valence of the ions, and in particular the effect is shifted to lower concentrations in accordance with the following plan: 1-1-valent electrolyte<2-1-valent electrolyte<1-2-valent electrolyte<2-2-valent electrolyte<3-2-valent electrolyte 2-3-valent electrolyte. The improvement of the activity as a flow resistance increasing agent in the case of the hydroxybenzoates and the compounds derived therefrom is particularly effective when a salt which simultaneously increases the pH value to $pH \geq 9.9$ is added. Thus, for example, the addition of Na₂CO₃ in the concentration range $0.1^xC \leq C \leq 10^xC$ has a particularly positive effect, where C is the molar concentration of the surfactant employed.

Instead of adding salts, it is also possible to follow a procedure in which the halogen salt of the cationic surfactant $R_1K^+Hal^-$, such as, for example, $[C_nH_{2n+1}N(CH_3)_3]Hal$ or

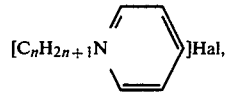

where Hal=Cl, Br or I, is used as the FRI in a molar ratio of 1:1 with an alkali metal salt of the anion NaA, such as, for example, Na n-alkyl-1-sulfonate, Na hydroxybenzoate and the acid ions derived therefrom, or such as, for example, Na hydroxy-naphthoate. The effect is then equivalent to the effect which is achieved with the pure surfactant salts with addition of alkali metal halides. Mixtures which deviate from the molar ratio 1:1, such as, for example, those of molar ratio 1:2, also exhibit an action as in FRI. The maximum activity as a flow resistance increasing agent also depends on the time which has elapsed since the preparation of the aqueous surfactant solutions. Although the surfactant solutions already exhibit an action immediately after preparation of the solutions, this action may also significantly change during one week. The time required to achieve optimum action can easily be determined for an individual case by simple experiments. In most cases, the optimum action is reached after one week. No further change or improvement in the action then occurs.

Some surfactants, such as, for example, hexadecylpyridinium salicylate are known (H. Hoffmann et al., Ber. Bunsenges. Phys. Chem. 85 (1981) 255) to build up large, non-spherical, usually rod-shaped micells from the individual surfactant ions and counter-ions from a quite specific concentration, characteristic for each surfactant, i.e. the $CMC_{II}$.

Surprisingly, it has now been found that cationic surfactants in aqueous solution are always effective as an FRI if they form non-spherical, preferably rod-shaped micells at concentrations greater than the $CMC_{II}$. Non-spherical, preferably rod-shaped micells are present if, when the surfactant solution is investigated with the aid of the electrical birefringence method with a pulsed, rectangular electrical field (E. Frédericq and C. Houssier, Electric Dichroism and Electric Birefringence, Clarendon Press, Oxford 1973 and H. Hoffmann et al., Ber. Bunsenges. Phys. Chem. 85 (1981) 255), a measurement signal is found, from the decrease in which a relaxation time of $\tau \geq 0.01$ μs can be determined. The lower concentration limit above which a surfactant is effective as a flow resistance increasing agent in aqueous solution is thus always determined by the $CMC_{II}$. The $CMC_{II}$ can be determined, for example, by measuring the electrical conductivity of the surfactant solution as a function of the surfactant concentration, as described by H. Hoffmann et al. (Ber. Bunsenges. Phys. Chem. 85 (1981) 255). It has been found that the value of the $CMC_{II}$ is a function of the temperature and shifts to higher surfactant concentrations as the temperature increases.

Determination of the $CMC_{II}$ at the use temperature by means of the electrical conductivity is a suitable preliminary experiment for establishing the minimum surfactant concentration necessary to achieve adequate action as a FRI in a certain temperature range.

The surfactants mentioned were tested for their effectiveness in increasing the flow resistance of flooding media in porous media or similar flow geometries with the aid of the apparatus described in German Offenlegungsschrift No. 2,904,848, by measuring the pressure drop $\Delta P$ over the zone $\Delta L$ for various filter speeds V when the particular aqueous solution flows through a measurement tube of diameter D filled with solid particles. The dimensionless parameters of coefficient of friction f and Reynolds number Re can be calculated from these values according to the equation $$f = \frac{\Delta P}{\rho V^2} \cdot \frac{d}{\Delta L} \cdot \frac{n^3}{(1-n)}$$

$$Re = \frac{v \cdot d \cdot \rho}{\eta(1-n)}$$

wherein $\rho$ is the density, $\eta$ is the dynamic shear viscosity, d is the average diameter of the solid particles and n is the volume porosity of the packing. The particular corresponding values of the pure solvent, i.e. water, are usually used for $\rho$ and $\eta$. The resistance constant is obtained from the resulting values of f and Re, as the product of these two parameters:

$$\Lambda = f \cdot Re$$

and this constant for the surfactant solutions investigated has been compared with the corresponding values for pure water in a conventional log-log plot against Re. For the flow of pure water through a porous medium, a resistance constant $\Lambda_{H2O}$ is found which, for $Re \leq 5$, is independent of the Reynolds number Re. A resistance-increasing action or an increase in the elastic viscosity exists if: $\Lambda_{TL} - \Lambda_{H2O} > 0$, for Re=constant if the relative resistance constant $\Lambda_R = \Lambda_{TL}/\Lambda_{H2O}$ exceeds the value 1 ($\Lambda_{TL}$=resistance constant of the surfactant solution).

The surfactant solutions mentioned act as flow resistance increasing additives in such a way that the relative resistance constant $\Lambda_R$ increases very rapidly above an assumed Reynolds number $Re_o$ as the Reynolds number increases, but then decreases again when a certain Reynolds number $Re_{max}$ is exceeded, with maximum increase in resistance. The degree of effectiveness of a surfactant solution as a medium which increases the resistance or elastic viscosity will be characterized in the following text by the assumed Reynolds number $Re_o$ and essentially by the maximum relative resistance constant $\Lambda_{R,max}$; accordingly, a surfactant solution with $\Lambda_{R,max}=20$ has a better activity as a flow resistance increasing medium than a surfactant solution with $\Lambda_{R,max}=10$.

The investigations on the surfactant solutions gave reproducible results only when the aqueous solutions of the surfactant salts had in each case been stored for about 1 week at the measurement temperatures before the measurements. Although the solutions also exhibit an action as a resistance increasing medium immediately after preparation, this can still change significantly in the course of one week.

The surfactants thus pretreated were subjected to a number of tests. Thus, as can be seen from Example 2, forcing the same surfactant solution through once did not result in a decrease in the flow resistance increasing action of the surfactants listed as a result of mechanical or chemical degradation. Furthermore, it has been found that the flow resistance increasing action of the surfactants mentioned increases as the concentration increases, the simultaneously occurring increase in shear viscosity as the surfactant concentration increases, as can be determined in a conventional viscometer, being negligibly small in comparison with the flow resistance increasing action in a porous medium. It as also found, as shown in Examples 5 and 6, that a reduction in the average particle diameter of the packing leads to low assumed Reynolds numbers or low assumed filter speeds for the flow resistance increasing effect, whilst the maximum value of increase in resistance which can be achieved remains constant. It has also been found that the flow resistance increasing effects mentioned for the surfactant solutions occur on the one hand in packings prepared from uniform-sized spheres with a broad particle diameter distribution, and on the other hand in sand packings prepared from angular particle material with a narrow or broad distribution of diameters.

The investigations carried out show that the surfactant salts mentioned are suitable as flow resistance increasing agents in all cases where aqueous flows through fissures, slits or pore spaces are to be controlled and or slowed down. In particular, the fingering of the flood front with subsequent breakthrough to the producing well which is feared in intensive production of crude oil (tertiary production of crude oil) can be prevented by using the surfactant salts, and thus the crude oil yield can be increased.

To achieve an optimum action as FRI in intensive production of crude oil, the dilute aqueous solutions of the surfactant salts should be prepared in, for example, storage tanks by stirring and, if necessary, by warming one or more hours before use, before the solutions are forced into the deposits in the customary manner by pumping. It is also possible to store the dilute solutions in the storage tanks for days or weeks without a decrease in the activity, as long as the temperature does not fall significantly below the solubility temperature of the particular surfactant salt.

EXAMPLE 1

A concentration series of 300, 500, 750, 1,000, 1,500, 2,000 and 3,000 ppm by weight of hexadecyltrimethylammonium salicylate (abbreviated in the following text to $C_{16}$TA-sal in demineralized water was prepared by weighing out the corresponding amounts by weight of 0.9; 1.5; 2.25; 3.0; 4.5; 6.0 and 9.0 g of $C_{16}$TA-sal per 3,000 g of demineralized water. After dissolving by stirring at room temperature, the solutions were briefly heated to about 90° C. and, after cooling to 40° C., were stored at this temperature without stirring for 1 week.

The increase in flow resistance was then investigated with the aid of a pore flow apparatus (German Pat. No. 2,904,848), by forcing an amount of liquid of 2,500 cm$^3$ from a pressurized stock container through the measurement tube filled with solid particles. The flow was controlled via an adjustable valve at the end of the measurement zone and was measured by determining the volume flowing out per unit time, so that the flow characteristics of the porous body could be determined with simultaneous measurement of the pressure drop along the pore measurement zone. The diameter D of the measurement tube was 25 mm, the total length L of the measurement tube was 18.9 mm, the measurement length $\Delta L$ for determining the pressure drop was 8.9 mm and the run-up length $L_A$ to the first pressure measurement bore was 5 mm.

The porous body is a random packing of glass beads of narrow particle size distribution d of 195 $\mu$m. The results are summarized in Table 1, the assumed Reynolds number $Re_o$, the maximum relative resistance constant $\Lambda_{R,max}$ and the associated $Re_{max}$ value being given.

EXAMPLE 2

A solution of $C_{16}TA$-sal in demineralized water with $c=300$ ppm was prepared, as described in Example 1, and was investigated in a pore flow apparatus with $d=195$ μm at $T=40°$ C. The solution forced through the measurement zone was investigated again several times in the pore flow apparatus for an increase in resistance. As can be seen from Table 2, even after the same volume of solution had flowed through the porous body 5 times, the same resistance increasing action still occurred, the flow curves of the individual measurement series virtually coinciding.

EXAMPLE 3

A solution of $C_{16}TA$-sal in demineralized water with $c=300$ ppm was prepared as in Example 1 and measured in the pore flow apparatus at $T=40°$ C., the glass bead diameter of the random packing d being 392 μm. The measurement result is shown in Table 3, in comparison with the values for $d=195$ μm.

EXAMPLE 4

Solutions of $C_{16}TA$-sal in demineralized water with concentrations of 300, 500, 750, 1,000, 2,000 and 3,000 ppm were prepared, as described in Example 1, but were heat-treated at $T=50°$ C. and investigated for their effectiveness in increasing resistance in the pore measurement zone with $d=392$ μm. The measurement results are summarized in Table 4.

EXAMPLE 5

Solutions of $C_{16}TA$-sal in demineralized water with concentrations of $c=750$ ppm and 1,000 ppm were prepared, as described in Example 1, and heat-treated at $T=55°$ C. and investigated in the pore measurement zone with $d=195$ μm. The measurement results are summarized in Table 5.

EXAMPLE 6

The surfactant solutions used in Example 5 were investigated in the pore measurement zone with $d=100$ μm at $T=55°$. The flow resistance increasing action is shown in Table 6. If the results are compared with those from Example 5, virtually the same increases in resistance are found where the particle diameters d are different, but the surfactant concentration is the same.

EXAMPLE 7

As described in Example 1, solutions of $C_{16}TA$-sal in demineralized water with concentrations of $c=500$ ppm and 750 ppm were prepared and were heat-treated at $T=55°$ C. and investigated in the pore measurement zone, the porous body consisting of Valentin-Busch quartz sand ($d=30-150$ μm, sharp-edged). The measurement results are summarized in Table 7

EXAMPLE 8

Solutions of $C_{16}TA$-sal in demineralized water with concentrations as in Example 1 were prepared and were heat-treated at $T=60°$ C. and then investigated for their activity as FRI in the pore measurement zone with $d=195$ μm at the same temperature. The measurement results are listed in Table 8. A flow resistance increasing effect is found at a surfactant concentration of $c \geq 750$ ppm.

EXAMPLE 9

As described in Example 1, solutions of $C_{16}TA$-sal in demineralized water with $c=750$ ppm were prepared, and the following concentrations of NaCl (in moles/liter) were also added: 0; $1.78 \times 10^{-3}$; $1.0 \times 10^{-2}$; $1.0 \times 10^{-1}$ and 1.0.

The heat treatment was carried out at $T=55°$ C.

These solutions were then investigated in the pore flow apparatus with $d=195$ μm at the same temperature. The results are summarized in Table 9. A significant improvement in the action as an FRI compared with the pure 750 ppm $C_{16}TA$-sal solution in demineralized water occurs with NaCl concentrations in a range below 0.1 mole/liter, as can be seen from Table 9.

EXAMPLE 10

As described in Example 1, aqueous solutions containing 750 ppm of $C_{16}TA$-sal were prepared, and were provided with the following concentrations of $CaCl_2$ (in moles/liter): 0; $1.0 \times 10^{-3}$; $1.0 \times 10^{-2}$ and $1.0 \times 10^{-1}$.

A significant improvement in the activity as an FRI compared with pure 750 ppm $C_{16}TA$-sal solution in water occurs with a $CaCl_2$ concentration of less than 0.1 mole/liter, as can be seen from Table 10.

EXAMPLE 11

Four solutions of tetradecyltrimethylammonium salicylate (abbreviated in the following text to $C_{14}TA$-sal) in demineralized water with $c=750$ ppm were prepared by weighing out in each case an amount by weight of 2.25 g of $C_{14}TA$-sal per 3,000 g of demineralized water. After dissolving by stirring at room temperature, the solutions were heated briefly to about 90° C. and then cooled to $T=25°$, 30°, 35° and 45° C. in separate heat-treatment devices, and were stored at the corresponding temperatures without stirring for 1 week.

The increase in flow resistance of these solutions was then investigated in the pore flow apparatus as described in Example 1, the glass bead diameter d being 195 μm and the surfactant solutions being measured at the corresponding temperatures.

The results are summarized in Table 11, the assumed Reynolds number $Re_o$, the maximum relative resistance constant $\Lambda_{R,max}$ and the associated $Re_{max}$ value being given.

EXAMPLE 12

As described in Example 11, aqueous solutions containing 750 ppm of $C_{14}TA$-sal were prepared and were provided with the following concentrations of $Na_2CO_3$ (in moles/liter): 0; $1.78 \times 10^{-3}$ and $1.0 \times 10^{-2}$.

A slight improvement in the activity as an FRI compared with a pure 750 ppm $C_{14}TA$-sal solution in water occurs when the $Na_2CO_3$ concentration selected is $1.78 \times 10^{-3}$, whilst a comparatively less powerful action is observed at $1.0 \times 10^{-2}$ moles/liter of $Na_2CO_3$.

EXAMPLE 13

An aqueous solution of tetradecyltrimethylammonium heptane-1-sulfonate ($C_{14}TA$-heptane-1-sulfonate) with $c=1,000$ ppm was prepared, as described in Example 1, by weighing out the salts $C_{14}TA$-Cl and Na heptane-1-sulfonate in a molar ratio of 1:1, and the solution was heat-treated at room temperature $T=22°$ C. and then investigated for an increase in flow resistance in the pore flow apparatus (d=275 μm) at the same temperature. A significant increase in resistance was found here, $Re_o$ being 0.6, $Re_{max}$ being 2.0 and $\Lambda_{R,max}$ being 10.

EXAMPLE 14

An aqueous solution of cetylpyridinium salicylate with c=500 ppm was prepared, as described in Example 1, by weighing out the salts cetylpyridinium chloride and sodium salicylate in a molar ratio of 1:1, and the solution was heat-treated at T=25° C. The solution was then investigated for an increase in flow resistance at the same temperature in the pore flow apparatus with d=392 μm. The assumed Reynolds number was $Re_o \approx 0.001$, $Re_{max}$ was 0.02 and $\Lambda_{R,max}$ was 50. At c=100 ppm, the $Re_o$ value was 0.1, the $Re_{max}$ value was 0.8 and the $\Lambda_{R,max}$ value was 3.75.

EXAMPLE 15

As described in Example 1, an aqueous solution of n-hexadecyltrimethylammonium 3-hydroxy-4-methylbenzoate with c=1,000 ppm was prepared and was investigated for an increase in flow resistance at room temperature (T=23° C.). The assumed Reynolds number $Re_o$ was 0.0001, the $Re_{max}$ was 0.03 and the maximum relative resistance constant $\Lambda_{R,max}$ was 150.

EXAMPLE 16

As described in Example 1, an aqueous solution of n-hexadecyldimethylhydroxyethylammonium salicylate with c=2,120 ppm was prepared and its increase in flow resistance was investigated at T=25° C. in the pore flow apparatus with d=392 μm. The assumed Reynolds number $Re_o$ was 0.002, $Re_{max}$ was 0.01 and the maximum relative resistance constant $\Lambda_{R,max}$ was 160.

TABLE 1

| | Glass bead packing | | | |
|---|---|---|---|---|
| | $C_{16}TA$-sal d = 195 μm | | | |
| T(°C.) | Concentration (ppm) | $Re_o$ | $Re_{max}$ | $\Lambda_{R,max}$ |
| 40 | 300 | 0.09 | 0.35 | 13.0 |
| 40 | 500 | 0.05 | 0.25 | 31.8 |
| 40 | 750 | 0.03 | 0.15 | 56.5 |

TABLE 2

| $C_{16}TA$-sal T = 40° C. c = 300 ppm d = 195 μm | | | |
|---|---|---|---|
| Experiment | $Re_o$ | $Re_{max}$ | $\Lambda_{R,max}$ |
| Fresh solution 1st experiment | 0.085 | 0.35 | 12.1 |
| Used solution 2nd experiment | 0.085 | 0.35 | 11.7 |
| 3rd experiment | 0.090 | 0.35 | 11.7 |
| 4th experiment | 0.085 | 0.35 | 12.1 |
| 5th experiment | 0.085 | 0.35 | 12.1 |

TABLE 3

| $C_{16}TA$-sal T = 40° C. c = 300 ppm | | | |
|---|---|---|---|
| Bead diameter (μm) | $Re_o$ | $Re_{max}$ | $\Lambda_{R,max}$ |
| 195 | 0.09 | 0.35 | 12.1 |
| 392 | 0.21 | 0.60 | 11.8 |

TABLE 4

| | Glass bead packing | | | |
|---|---|---|---|---|
| | $C_{16}TA$-sal in demineralized water d = 392 μm | | | |
| T(°C.) | Concentration (ppm) | $Re_o$ | $Re_{max}$ | $\Lambda_{R,max}$ |
| 50 | 300 | 1.30 | 3.5 | 3.8 |
| 50 | 500 | 0.80 | 1.8 | 11.1 |
| 50 | 750 | 0.55 | 1.3 | 17.2 |
| 50 | 1,000 | 0.40 | 0.9 | 33.4 |
| 50 | 1,500 | 0.40 | 0.8 | 55.6 |

TABLE 5

| | Glass bead packing | | | |
|---|---|---|---|---|
| | $C_{16}TA$-sal in demineralized water d = 195 μm | | | |
| T(°C.) | Concentration (ppm) | $Re_o$ | $Re_{max}$ | $\Lambda_{R,max}$ |
| 55 | 750 | 0.45 | 1.0 | 7.1 |
| 55 | 1,000 | 0.31 | 0.8 | 14.1 |

TABLE 6

| | Glass bead packing | | | |
|---|---|---|---|---|
| | $C_{16}TA$-sal in demineralized water d = 100 μm | | | |
| T(°C.) | Concentration (ppm) | $Re_o$ | $Re_{max}$ | $\Lambda_{R,max}$ |
| 55 | 750 | 0.14 | 0.34 | 7.2 |
| 55 | 1,000 | 0.11 | 0.30 | 13.3 |

TABLE 7

| $C_{16}TA$-sal in demineralized water | | Valentin-Busch quartz sand packing d = 30-150 μm | | |
|---|---|---|---|---|
| T(°C.) | Concentration (ppm) | $Re_o$ | $Re_{max}$ | $\Lambda_{R,max}$ |
| 55 | 500 | 0.25 | 0.50 | 2.7 |
| 55 | 750 | 0.17 | 0.38 | 7.9 |

TABLE 8

| | Glass bead packing | | | |
|---|---|---|---|---|
| | $C_{16}TA$-sal in demineralized water d = 195 μm | | | |
| T(°C.) | Concentration (ppm) | $Re_o$ | $Re_{max}$ | $\Lambda_{R,max}$ |
| 60 | 300 | — | — | 1 |
| 60 | 500 | — | — | 1 |
| 60 | 750 | 3.0 | 4.0 | 1.6 |
| 60 | 1,000 | 1.5 | 2.4 | 5.8 |
| 60 | 1,500 | 0.9 | 1.9 | 11.3 |
| 60 | 2,000 | 0.5 | 1.9 | 22.4 |
| 60 | 3,000 | 0.4 | 1.4 | 42.6 |

TABLE 9

| $C_{16}TA$-sal c = 750 ppm R = 55° C. d = 195 μm | | | |
|---|---|---|---|
| NaCl concentration moles/liter | $Re_o$ | $Re_{max}$ | $\Lambda_{R,max}$ |
| 0 | 0.45 | 1.0 | 9.7 |
| $1.78 \times 10^{-3}$ | 0.40 | 1.1 | 14.7 |
| $1.00 \times 10^{-2}$ | 0.26 | 0.9 | 23.1 |
| $1.00 \times 10^{-1}$ | — | — | 1 |
| $1.0 \times 10^{0}$ | — | — | 1 |

TABLE 10

| $C_{16}TA$-sal c = 750 ppm T = 55° C. d = 195 μm | | | |
|---|---|---|---|
| $CaCl_2$ concentration moles/liter | $Re_o$ | $Re_{max}$ | $\Lambda_{R,max}$ |
| 0 | 0.45 | 1.0 | 9.7 |
| $1.0 \times 10^{-3}$ | 0.20 | 0.7 | 16.81 |
| $1.00 \times 10^{-2}$ | 0.35 | 1.2 | 17.6 |
| $1.0 \times 10^{-1}$ | — | — | 1 |

TABLE 11

| | Glass bead packing | | | |
|---|---|---|---|---|
| | $C_{14}$TA-sal in demineralized water $d = 195$ μm | | | |
| T(°C.) | Concentration (ppm) | $Re_o$ | $Re_{max}$ | $\Lambda_{R,max}$ |
| 25 | 750 | 0.06 | 0.35 | 27.9 |
| 30 | 750 | 0.16 | 0.60 | 18.9 |
| 35 | 750 | 0.40 | 1.00 | 12.5 |
| 45 | 750 | — | — | 1 |

TABLE 12

| $C_{14}$TA-sal  c = 750 ppm  T = 25° C.  d = 195 μm | | | |
|---|---|---|---|
| $Na_2CO_3$ concentration moles/liter | $Re_o$ | $Re_{max}$ | $\Lambda_{R,max}$ |
| 0 | 0.06 | 0.35 | 29.9 |
| $1.78 \times 10^{-3}$ | 0.05 | 0.4 | 30.6 |
| $1.00 \times 10^{-2}$ | 0.30 | 1.0 | 15.0 |

We claim:

1. A method of controlling the mobility of an aqueous flow through fissures, slits or pores, which comprises adding to the aqueous medium an aqueous solution conprising a dissolved cationic surfactant which, on measurement of the electric birefringence with a pulsed, rectangular electrical field in a pure aqueous solution gives a measurement signal, from the decrease of which a relaxation time of 0.01 μs to 10 ms, in particular of 0.1 μs—2 ms, results.

2. A method of controlling the mobility of an aqueous flow through fissures, slits or pores, which comprises adding to the aqueous medium a cationic surfactant which, on measurement of the electric birefringence with a pulsed, rectangular electrical field in a pure aqueous solution gives a measurement signal, from the decrease of which a relaxation time of 0.01 μs to 10 ms results, said cationic surfactant being a compound of the formula $$R_1—K^+A^-$$

in which $R_1$ denotes $C_{12}$-$C_{26}$-alkyl or $C_{12}$-$C_{26}$-alkenyl, $K^+$ denotes a group of the formula

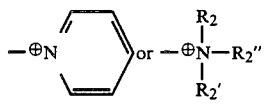

$R_2$ denotes $C_1$-$C_3$-alkyl, preferably methyl, $R'_2$ denotes $C_1$-$C_3$-alkyl, $R''_2$ denotes $C_1$-$C_3$-alkyl, or $R''_2$ denotes $(CH_2CH_2O)_xH$, where x denotes from 1 to 3, and $A^-$ denotes an anion of the following formula: $SCN^-$, $R_3SO_3^-$, where $R_3$ is $C_6$-$C_9$-alkyl or -alkenyl and the sum of the carbon atoms in $R_1$ and $R_3$ should be at least 21;

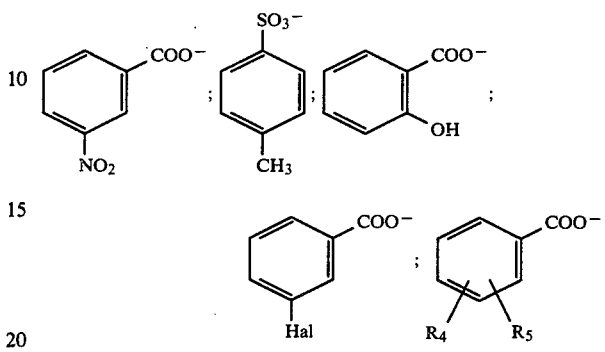

where Hal is chlorine or bromine, $R_4$ is $C_1$-$C_5$-alkyl, $C_2$-$C_5$-alkenyl or $C_1$-$C_5$-alkoxy in positions 3, 4, 5 and 6 and $R_5$ is hydrogen or hydroxyl in positions 2 and 3 relative to the carboxyl group, or

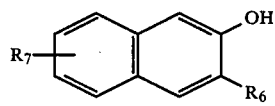

where $R_6$ is COO— or $SO_3$— and $R_7$ is hydrogen or methyl.

3. The method as claimed in claim 2, wherein the compound is added in an amount of 0.01 to 5% by weight.

4. The method as claimed in claim 2, wherein an alkali metal salt, alkaline earth metal salt, transition metal salt, ammonium salt or aluminum salt is also additionally present.

5. The method as claimed in claim 2, wherein said aqueous medium is the flooding water in tertiary production of crude oil.

6. The method as claimed in claim 2, wherein $R_2$, $R''_2$, and $R''_2$ are methyl.

7. The method as claimed in claim 2, wherein $R_2'$ denotes $(CH_2CH_2O)_xH$.

8. The method as claimed in claim 7, wherein x is 1 or 2.

* * * * *